July 5, 1938.　　A. D. MacLEAN ET AL　　2,122,529
PRESSURE COMPENSATING GAS METER
Filed June 21, 1930　　2 Sheets-Sheet 1
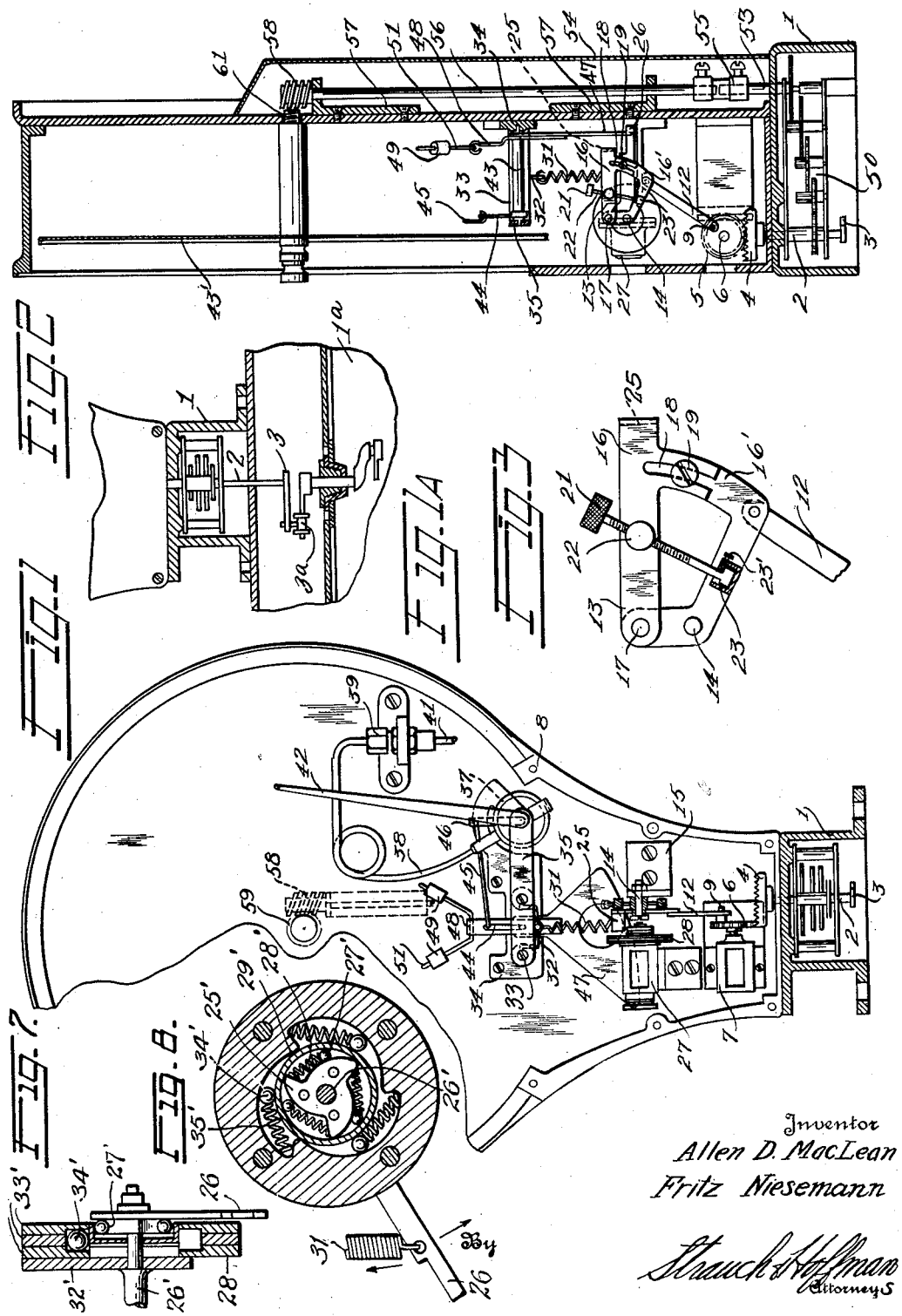
Inventor
Allen D. MacLean
Fritz Niesemann
Strauch & Hoffman
Attorneys

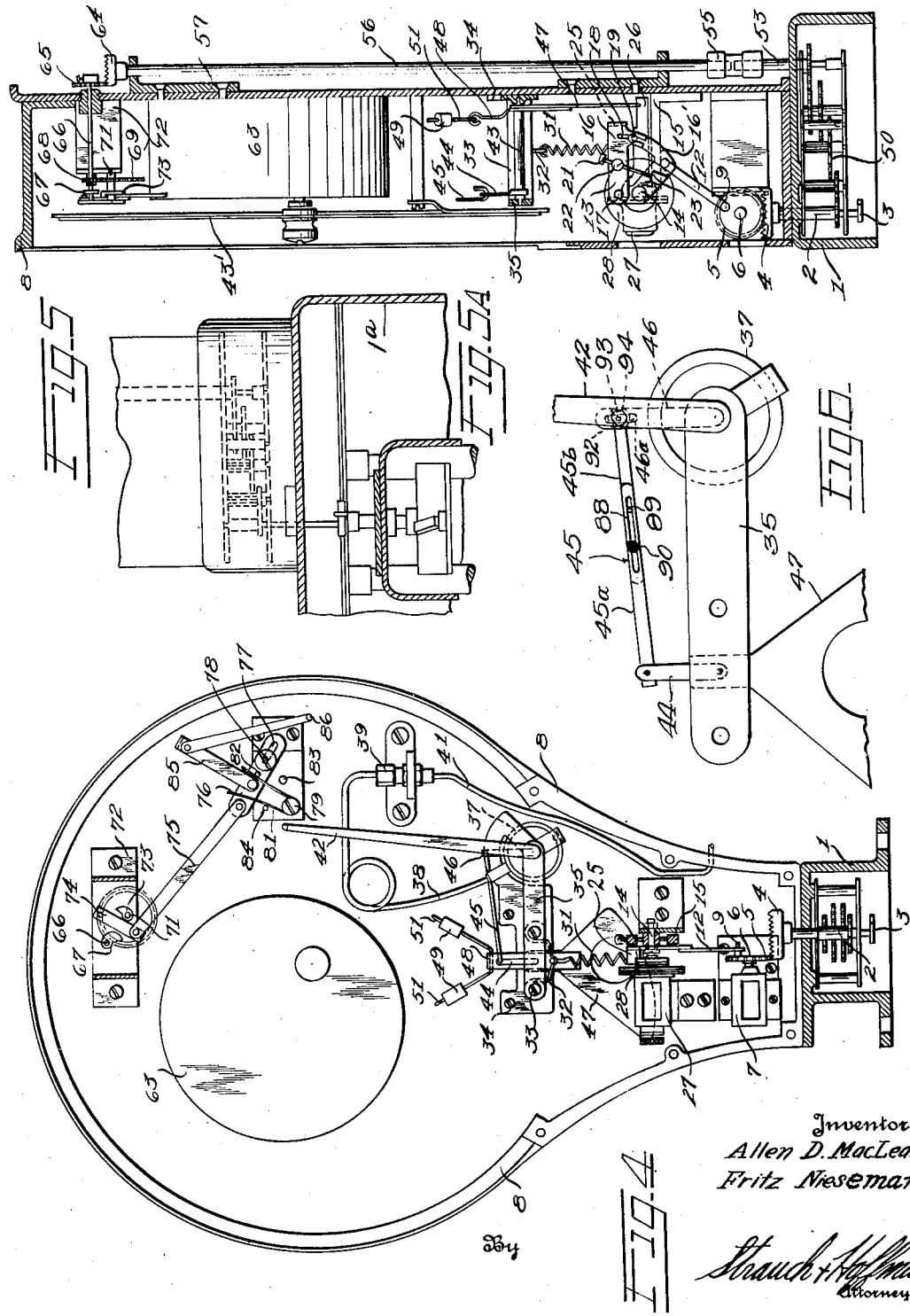

Patented July 5, 1938

2,122,529

UNITED STATES PATENT OFFICE 2,122,529

PRESSURE COMPENSATING GAS METER

Allen D. MacLean and Fritz Niesemann, Pittsburgh, Pa., assignors to Pittsburgh Equitable Meter Company, Pittsburgh, Pa., a corporation of Pennsylvania Application June 21, 1930, Serial No. 462,843

10 Claims. (Cl. 73—233)

This invention relates to an improved mechanism for directly indicating accurately the total flow of gases in spite of variations in the pressure of such gases during the period over which the indication is given.

As is well known, the usual type of gas meter registers the volume of flow of gas passing therethrough without taking into account or compensating for the fact that a much greater quantity of gas by weight passes through the meter when the pressure on the line is increased. When gas is sold to large users thereof, such as industrial plants, the contract between the gas company and the user usually designates the price of a unit volume of gas at a predetermined pressure, such as four ounces pressure for example. Since the gas is a compressible medium the quantity passing through a meter is dependent not only upon the volume, but also upon the pressure in accordance with Boyle's law. In most installations it is impractical for the gas company to constantly maintain a definite pressure at all times, and frequently it is not feasible to keep as low a pressure as four ounces on the main, since the fluctuating demands of the consumers require a much higher pressure at peaktimes. Quite frequently gas companies maintain variable pressures in their line under such conditions and obviously the total quantity of gas by weight, or the B. t. u. content thereof is much greater at these higher pressures than at the lower pressures, so that ordinary meters give no correct indication of the total quantity of gas that has passed therethrough.

In order to assure a correct charge to the consumer for the actual amount of gas used, various expedients have heretofore been resorted to by gas companies. In some installations, the usual displacement type gas meter has been provided with a chart driven either by clockwork, or by movement of the meter itself, this chart being connected with a static pressure gauge such that the static pressure of the gas is registered on the chart. Thus the volume of gas is registered by the gas meter and the pressures thereof may be read from the pressure chart and a series of calculations may be made for set intervals of time, for example, for each half hour, or by volume increments to thus secure an approximately correct calculation of the volume of gas at an unvarying or base pressure. Obviously either of the above methods are laborious and time consuming and liable to human error in calculating the corrected volume of gas.

It is an object of this invention therefore, to provide a measuring system and apparatus for use with gas lines in which the corrected volume of gas as reduced to a predetermined base pressure may be read directly from the meter without computations.

Another object of this invention is to provide a compensating gas meter of the above indicated type in which the parts are compactly arranged in a single instrument and in which the volume of gas passing through the meter is automatically reduced to a predetermined base pressure irrespective of fluctuations in pressure in the gas line.

Another object of this invention is to provide a compensating or direct reading gas meter of the above indicated character embodying mechanism whereby the meter may be readily changed to compensate for different base pressures of the gas.

Another object of this invention is to provide a compensating gas meter of the above indicated character having associated therewith a chart upon which is recorded the actual pressures of gases and having a corrected volume index or register and an uncorrected volume index, whereby the accuracy of the corrected index may be checked by the old method of calculating the pressure and the uncorrected volume, and whereby the pressures on the line are automatically recorded for future reference.

Another object of this invention is to provide a compensating gas meter including a corrected volume index, in combination with a pressure chart upon which is recorded the actual pressures of the gas for each period of time, and upon which is also recorded the volume of gas passed for each period of time.

These and various other objects of our invention will be apparent from the following description and the appended claims when taken in connection with the accompanying drawings, wherein Figure 1 is a view taken partly in section of one embodiment of our invention.

Figure 1A is a diagrammatic view similar to Figure 1 showing the embodiment of Figure 1 connected to a volume gas meter and its register drive.

Figure 2 is a sectional view taken at right angles to Figure 1.

Figure 3 is an enlarged detail of the operating yoke for the corrected meter index.

Figures 4 and 5 are views similar to Figures 1 and 2 showing another embodiment of our invention.

Figure 5A is a diagrammatic view similar to Figures 2 and 5, showing the embodiments of the invention illustrated in Figures 1 to 5 connected to a volume gas meter and its register drive.

Figure 6 is an enlarged detail view of a slightly modified form of the cam positioning device.

Figures 7 and 8 are longitudinal sectional views of the one-way friction ball clutch.

Referring to Figures 1 and 2 of the drawings wherein is illustrated one embodiment of our improved meter, there is provided a base portion 1 adapted to be detachably connected to volume gas meter 1a, of conventional type, such as the displacement meter shown in the application of A. D. MacLean and H. G. Weymouth Serial No. 288,230—filed June 25, 1928, or to any other form of gas meter, whether rotary or displacement. A shaft 2 is journaled in the upper portion of the base 1 and has a crank or arm 3 on the lower end thereof for engagement with rotatably driven portion 3a of the meter. The shaft 2 has secured on the upper end thereof a crown gear 4 for engagement with a correspondingly meshing gear 5 on a shaft 6 of a volume registering index 7.

The crown gear 4, gear 5 and the volume index 7 are positioned within an upwardly extending casing 8 for housing these parts and for also housing the corrected index to be later described and the operating mechanism therefor.

The gear 5 has a crank pin 9 thereon with which is engaged a connecting link 12, the other end of the connecting link 12 being pivotally secured to an oscillating segment 13. The segment 13 is journaled on a shaft 14 of a bracket 15 secured to the casing 8. The segment 13 as seen in Figure 3, comprises two portions 16 and 16' pivotally connected together at 17 and forming in effect a yoke, the two portions 16 and 16' overlapping at a point spaced from the pivot 17. The upper portion 16 has a slot 18 therein through which there passes a set screw 19 threadedly engaged with the lower portion 16' of the segment. Obviously by loosening the set screw 19 the two portions 16 and 16' of the segment may be spread apart or moved closer together.

In order to provide an accurate adjustment for these parts, reference being had to Figure 3, an adjusting screw 21 is threaded in a boss 22 of the upper portion 16 and is journaled in a bearing block 23 on the lower portion 16' being secured in the bearing block by a set screw 23', or by other suitable means. By loosening the set screw 19, the portions 16 and 16' of the segment may be relatively adjusted by turning the adjusting screw 21, rotation thereof in one direction moving the two sections 16 and 16' closer together and rotation in the opposite direction spreading these members.

The upper portion 16 of the segment 13 has a rearwardly extending arm 25 which projects above an index driving lever or arm 26. The arm 26 is secured to the driving portion of a frictional one-way clutch or ratchet mechanism indicated generally by the numeral 28, whereby the corrected indicating index 27 is driven in one direction only by the arm 26. In the preferred embodiment this clutch 28 is of the friction ball ratchet type and comprises a cam member 25' secured to arm 26 and having a plurality of eccentrically curved cam faces and which is loosely swiveled on the counter drive shaft 26'. An intermediate drum shaped member 29' is secured to the shaft 26' and surrounds the cam 25', and a plurality of balls 27' are interposed between the cam 25' and drum 29' and are urged outwardly by the springs 28'. It will be seen that oscillation of arm 26 downwardly causes the balls to become wedged between the cam 25' and the drum 29' and thus drive the drum and shaft 26' in one direction.

In order to prevent back rotation of the shaft 26' when the arm 26 oscillates in an upward direction, an anti-reverse mechanism is provided. This mechanism consists of an outer plate 32' in which shaft 26' is rotatable and which is suitably fixedly mounted. A plurality of inner plates 33' are secured thereto and have inner cam surfaces, and balls 34' are located between the drum 29' and plates 33', the balls being urged into wedging engagement by springs 35'. It will be seen that after arm 26 has completed its downward stroke, the upward movement of the arm releases the balls 27' from wedging engagement between cam 25' and drum 29' and wedges balls 34' between the drum 29' and outer plates 33' thus preventing reverse rotation of shaft 26'.

The arm 26 is biased to its upward position by a spring 31 secured thereto, the other end of said spring being connected to a member 32, which consists of a yoke shaped wire or rod connected at its opposite ends to supporting rods 33. The rods 33 are secured at one end to a bracket 34 mounted on the casing 8, and support a mounting strap 35. As seen from Figure 2 the strap 35 is spaced from the back of the casing 8, and provides, in conjunction with bracket 34, a support for a pressure tube 37. The pressure tube 37 is connected to the conduit 38 which in turn is connected by the removable union 39 to the conduit 41 which is connected to the gas conduit, to thereby subject the pressure tube 37 to the static pressure of gas in said conduit. The movable end of the pressure tube 37 has secured thereto an indicating hand 42 which projects over the front of a chart 43' to register on said chart the static pressure of the gas. The pressure tube shown is of the type described and claimed in application of H. Chrisman #688,387, filed January 25, 1924, although it will be understood that other types of pressure gauges may be used.

Rotatably journaled in the bracket 34 and the supporting strap 35 is a shaft 43 having secured adjacent one end thereof an upstanding arm 44. The arm 44 is connected to a link 45 the opposite end of which is connected to a crank 46 secured to the movable end of the pressure tube 37 and movable in unison with the indicating hand 42.

Adjustably and detachably mounted on the rotatable shaft 43 by any well known expedient for example by a snug fit with shaft 43, or by a set screw is a cam element 47 whose lower edge extends downwardly into abutting relation with the oscillatory index driving arm 26. An arm 48 secured to the cam 47 projects above the pivot point thereof and has secured adjacent the upper end thereof the balancing weights 49 adjustably secured to the arms 51 of a V-shaped rod, whereby the effect of gravity when the cam 47 moves out of its normal vertical position may be balanced. The cam 47 is detachably mounted on the shaft 43 whereby cams having different angular lower edges may be substituted. Each cam may be designed for a given base pressure. For example, one cam may be designed for four ounce base pressure, another for ten ounce base pressure and others for any desired pressure whereby our improved meter may be converted to give corrected readings for varying base pressures.

From the description of the apparatus as above given it will be obvious that the arm 46 will oscillate in accordance with the varying pressures in the gas conduit, thereby moving arm 44 secured to the rotatable shaft 43 to thus move the cam 47 into varying positions depending upon the static pressure of the gas. Since the lower edge of the cam 47 is positioned to engage the upper edge of the lever 26 which drives the compensating index 27, and oscillates in a plane passing through the shaft 43, it will be obvious that the throw of the lever 26 is governed by the position of the cam 47 and therefore by the static pressure of the gas.

The operation of this embodiment of our improved compensating meter is as follows. With the conduit 41 connected to the gas conduit the recording hand 42 will assume a position in accordance with the static pressure of the gas, and the cam 47 will also assume a position dependent upon said static pressure. The coil spring 31 will hold the lever 26 upwardly into engagement with the cam 47. As the volume gas meter moves in accordance with the flow of gas, the shaft 2 is rotated by the arm or lever 3 thereon rotating the gear 5 by means of the crown gear 4. As the gear 5 rotates the index 7 is caused to register the volume of gas passing through the meter, and the crank pin 9 on the gear 5 causes the connecting link 12 to impart an oscillatory movement to the yoke shaped segment 13. Downward movement of the segment 13 causes the arm 25 thereof to engage the upper edge of the lever 26 to pull the same downwardly against the tension of the spring 31, this downward movement causing the ratchet mechanism 28 to be engaged and register the movement of the arm 26 on the corrected index 27. As the segment 13 passes the lowest point of its movement and the arm 25 thereof starts upwardly the lever 26 follows the arm 25 due to the tension of spring 31. However, the ball ratchet at once disengages so that during upward movement of the arm 26 the index 27 is not rotated. The upward movement of the arm 26 is dependent upon the position of the cam 47, the arm 26 engaging the lower edge of the cam 47, and the arm 25 of the segment 13 continues its upward movement as governed by the stroke of the crank 9.

The shape of the cam 47 is such that the angular movement of the lever 26 for any pressure P always is proportional to the gas volume passed at that pressure. This may be illustrated by the following example. Assuming the base pressure to be $P_b = 0.25$ lb., if the actual pressure or static pressure in the conduit equals 0.25 lb., both the indexes 27 and 7 must register the same since the actual pressure equals the base pressure. The angular movement of the lever 26 at any pressure P may be designated A, and at the base pressure 0.25 lb. may be arbitrarily selected to equal 18°. When the actual pressure changes such that P equals, for example, ten pounds, the angular movement A of the lever 26 should be according to Boyle's law $$18° \cdot \frac{P_a + P}{P_a + P_b} = 18° \cdot \frac{14.4 + 10}{14.4 + 0.25} = 30° \text{ (approx.)}$$

where $P_a$ indicates atmospheric pressure taken as 14.4 lbs. per square inch.

It will thus be seen that the radius of the cam is such that for a static pressure of ten pounds in the conduit the lever 26 oscillates through an angle of 30°. The shape of the cam 27 may be easily calculated for a given static pressure range to allow lever 26 the desired range of movement for a given static range. The movement of the index or counter 27 being proportional to the angular movements of the lever 26, the index 27 will thus register in cubic feet the volume of gas as reduced to a base pressure of 0.25 lb., irrespective of the actual pressure in the gas conduit.

The adjusting screw 21 provides a fine adjustment for the arm 25 of the movable segment 13, whereby the downward angular movements of the lever 26 corresponding to absolute zero may be adjusted. An adjustment for insuring that the cam 47 is accurately positioned in accordance with varying static pressures may be provided, such as an adjustable mounting of the cam on its shaft 43, or an adjustment for the link 45 or the arm 46.

Figure 6 shows adjustments for the link 45 and the arm 46. The arm 45 of Figures 1 and 4 is divided into two parts 45a and 45b. One of these parts, 45a in the illustrated example, is provided with an elongated slot 88. The part 45b is provided with a pin 89 and a bolt and nut 90 or other suitable clamping means. The length of the slot 88 is greater than the distance between the pin 89 and the bolt 90 so that when the nut is loosened, the part 45a may be moved longitudinally with respect to the part 45b to vary the length of the link 45 composed of the parts 45a and 45b.

The arm 46 is provided with a slot 46a. An adjustable pivotal connection is provided for pivotally connecting the link 45 at its end to the arm 46. The adjustable connection may comprise a bolt having an enlarged portion 92 and a threaded stem 93. The arm 46 is clamped between the portion 92 and a nut 94 on the threaded stem. A pivot pin for the link 45 extends from the portion 92 in alignment with the stem 93. The point of connection of the link 45 is adjustable by loosening the nut 94 whereupon the stem 93 may be moved in the slot 46a.

If the reading of the corrected counter 27 is observed to be in error it may be due to the fact that the angular movement of the cam 47 is not correctly proportioned to the angular movement of the arm 46. This proportion can be varied by varying the position of the stem 93 in the slot 46a. The point of zero pressure on the edge of the cam 47 can be brought opposite the edge of the lever 26 when no pressure is applied to the pressure tube 37 by varying the length of the link 45 in the manner described.

It will thus be seen that we have provided a mechanism wherein the volume of gas passed through a volume gas meter is automatically and continuously reduced to a base pressure for registering on a dial, thus obviating the necessity for all calculations. The provision of the recording pen 42 and cooperating scale or chart 43' enables checking the instrument against possible errors or inaccuracies in the indicating indexes 7 and 27, and permits the consumer or company to check the reading of the compensated index 27 to verify the correctness thereof. If desired, the construction may be simplified and rendered more compact by omitting the pen 42 and chart 43'.

The present meter is comparatively simple in construction, is not easily deranged, is accurate and is readily adjustable for various base pressures by changing the cam of the meter.

The chart 43' may be driven by a clock mechanism or may be driven by the movement of the gas meter itself. The latter form of drive is shown in the embodiment of our invention shown in Figures 1 and 2 wherein the drive shaft 2 has a gear thereon for engagement with a train of gears 50 for driving a vertical shaft 53 extending upwardly on the back of the casing 8. The shaft 53 is secured to a coupling member 55 which also has secured thereto a vertically extending shaft 56 guided for rotation in brackets 57 secured to the casing 8. At its upper end the shaft 56 has a worm 58 thereon for engagement with a corresponding worm gear 59 secured to a forwardly extending shaft 61, the shafts and gears being enclosed in an auxiliary casing 54. The shaft 61 has secured to its forward end the rotative chart 43'. By this construction it will be seen that the chart 43' is driven by movements of the volume gas meter and the pen 42 will record on said chart the static pressure of the gas for each increment of volume of gas passed. Obviously the train of gears 50 may be so chosen that the chart 43 will make one complete revolution for any desired volume of gas such as 100,000 feet, the chart being then divided into segments with each segment representing 10,000 cubic feet with smaller divisions representing 1,000 cubic feet.

By provision of the above mechanism it will be clear that a combined gas meter is provided embodying an index whose readings are automatically corrected to any given base pressure and also embodying an uncorrected index for total volume with a chart upon which is recorded the static pressures of the gas during any cycle of operation. As previously indicated, however, applicants contemplate the use of the corrected or compensated index alone, if desired, without the provision of the movable chart and the pressure indicating pen.

In Figures 4 and 5 we have illustrated another embodiment of our improved gas meter wherein the chart is driven by a clockwork and additional recording mechanism is associated therewith for directly indicating on the chart increments of volume of gas in addition to the pressure thereof. In this embodiment of our invention the mechanism for operating the compensated dial index 27 is the same as described in connection with Figures 1 and 2. Also the recording pen 42 cooperates with the chart in a similar manner to register the pressures thereon. However, in this form of our invention the movable chart 43' is driven by a clockwork 63. The vertical shaft 56 extends upwardly adjacent the upper edge of the casing 8 and has secured on the upper end thereof a crown gear 64 engaging a gear 65 on a shaft 66, which projects into the casing 8. The shaft 66 has a cam 67 thereon and a gear 68 meshing with a larger gear 69 secured to a counter-shaft 71, the shafts 66 and 71 being supported in a bracket 72. The shaft 71 is also provided with a cam 73.

Referring to Figure 4 it will be seen that the cams 67 and 73 are positioned for engagement with a pivoted arm 74 on the bracket 72, the lower end of the arm 74 being pivotally connected to a link 75 the opposite end of which is linked to a reciprocating lever 76. The lever 76 has a slot 77 therein through which passes a screw 78 for guiding said lever. Secured to a post 79 is a hairpin spring 81 for cooperation with a pin 82 carried on the lever 76. Stops 83 and 84 are provided for engagement of one or the other of the arms of the hairpin spring 81.

The arm 76 carries an outwardly extending indicating arm 85 which extends around the edge of the chart 43' whereby the indicating pen 86 thereof will record on said chart. The train of gearing 50, the crown gear 64 and gear 65 are so arranged that the shaft 66 and the cam 67 thereon will make one revolution for each 1,000 cubic feet of gas and the shaft 71 with the cam 73 thereon will make one revolution for each 10,000 cubic feet of gas. If the meter is installed in a consumer's line whose consumption of gas is relatively high, the hairpin spring 81 is arranged to engage on the upper side of the pin 82 to normally hold links 75, 76 and pivoted member 85 in the lower position as shown in Figure 4. As the volume gas meter moves the cam 73 is rotated to engage the pivoted link 74 to draw the link 75 and lever 76 upwardly, thus imparting an oscillatory movement to the pen arm 85 and the pen 86 to record oscillations on the edge of the chart 43.

An oscillation is thus imparted to the pen 86 for each 10,000 cubic feet of gas passing through the meter. If the consumer does not use much gas, the spring 81 is reversed so that the upper portion thereof engages below the pin 82 to thus move the link upwardly for cooperative engagement with the cam 67 on the 1,000 cubic feet shaft. In this position the pen 86 will oscillate once for each 1,000 cubic feet of gas consumed.

By this construction an indication will be made on the chart adjacent the edge thereof, showing the total volume of gas used, and since said shaft is rotated by a clockwork, the rate of consumption of the user can be read directly from the chart. The mechanism for recording on the edge of the chart as above described is shown and claimed in a copending application of J. R. Armstrong and L. H. Duncan, S. N. 78,545, filed December 31, 1925, now Patent Number 1,816,995.

It will be apparent that the embodiment of our invention shown in Figures 4 and 5 provides a gas meter in which a corrected index compensates for pressure variations of the gas and automatically reduces the volume to a base pressure, in combination with a chart upon which is recorded the static pressure for definite periods of time and in addition thereto the total volume of gas passing through the meter, and further provides an index which reads for total volume of gas irrespective of pressure. We have therefore provided in a single instrument an operative mechanism wherein all variable functions are recorded simultaneously and the necessity for any calculation is avoided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:

1. In a volumetric gas meter, an index; means for driving said index in accordance with the volume flow of gas through said meter so that said index will register the volume of gas reduced to a predetermined base pressure comprising a rotating shaft, an oscillatory lever, and a one way ratchet mechanism operatively connecting said lever and said index; means comprising a reciprocating member driven by said rotating shaft; a second member adjustable with respect to said first member, said second member having an arm positioned to engage said lever for moving said lever in one direction in response to each increment of volume of gas passed through the meter whereby movement of said lever by the meter is adjustable; means biasing said lever in reverse direction; a cam against which said biasing means tends to move said lever; and means to adjust said cam in accordance with the static gas pressure whereby the operable throw of said lever is varied in accordance with the pressure.

2. In a mechanism adapted for connection to a volumetric gas meter; an index; means to drive said index to indicate the volume of gas passing through said meter; a second index; pressure responsive means; a chart associated with said meter; time train means for driving said chart; mechanism including said pressure responsive means for recording on said chart the static pressures of gas; means operably connected to said meter for recording on said chart the volume of gas passed through the meter; and means operatively connected to said first mentioned index controlled by said pressure responsive means for driving said second index to vary the readings thereof in accordance with pressure variations to indicate the volume of gas passing through the meter reduced to a predetermined lower base pressure.

3. In mechanism adapted for connection to a volumetric gas meter, an index; and means to drive said index to vary the readings thereof in accordance with supply pressure variations to indicate the volume of gas passing through said meter reduced to a predetermined base pressure, said drive means comprising solely mechanical means including cam means; and pressure responsive means to control said solely mechanical means in accordance with said supply pressure; a chart; means for driving said chart through equal intervals for equal periods of lapsed time; means including said pressure responsive means for recording on said chart the supply pressures of gas; and means for recording thereon volume units of gas passing through said meter, said chart driving means, said means for recording on said chart volume units of gas passing through said meter, and said pressure recording means cooperating to record simultaneously units of gas volume and line pressure affecting said index drive means.

4. In combination with a meter; an operating shaft driven by said meter in accordance with the volume flow of fluid through said meter; a register driven from said shaft; a second register; and means for driving said second register at a variable rate, comprising an oscillatory arm, a member pivotally connected to said operating shaft to oscillate said arm, a shaft driven in one direction from said oscillatory arm through frictional one-way clutching means, and calibrating means for varying the operative effect of said member on said arm to selectively vary the average period of rotation of said driven shaft with respect to said operating shaft.

5. In a volumetric gas meter for indicating the volume flow of gas passed therethrough as reduced to a predetermined base pressure, a rotating shaft driven by said meter; an oscillatory lever; means for biasing said lever in one direction; a pivoted arm engaging said lever, oscillatory means connected to said shaft and engaging said arm to oscillate said arm; a variable stop against which said biasing means tends to move said lever; and pressure responsive means to adjust said stop in accordance with the static pressure of the gas measured.

6. In a volumetric gas meter, an index; a cam; pressure responsive means for positioning said cam; operating means for said index cooperating with said cam to register thereon the volume of gas passed as reduced to a predetermined base pressure; said cam being disposed in a plane at substantially a right angle to the operating plane of said index operating means, and the contour of the cam being such that the index accurately registers the volume of gas as reduced to the base pressure irrespective of variations in gas pressure.

7. In a direct reading gas meter, an index; means for driving said index by the flow of gas through the meter whereby said index will register the volume of gas reduced to a predetermined base pressure, said means comprising a reciprocating member; means driven by the flow of the gas through the meter to reciprocate said member; a pivoted oscillatory arm oscillated in one direction by said reciprocating member; a one-way clutch mechanism connecting said arm with said index; biasing means for biasing said arm in the opposite direction, a shaft, a cam mounted on said shaft; pressure responsive means; and means connecting said cam and pressure responsive means, said arm being oscillated in a plane passing through said shaft.

8. In a direct reading gas meter, an index; and means for driving said index to register thereon the volume of gas passing through the meter reduced to a predetermined base pressure; said driving means comprising oscillating means, a pressure responsive element, an arm, means operably connecting said arm to said pressure responsive element and oscillated in response to varying pressures of the gas; a link; means for varying the effective length of said link; means for adjustably connecting said link at various angular positions to said arm; a pivoted cam; means connecting said cam to said link and operable thereby to various positions in accordance with the gas pressure, said cam varying the position of said oscillating means for said index to cause the same to register any volume of gas reduced to a predetermined base pressure, said adjustable means being adapted to vary the ratio of movement between the pressure responsive element and the cam.

9. In a direct reading gas meter, an index; and means for driving said index by the flow of gas through the meter whereby said index will register the volume of gas reduced to a predetermined base pressure comprising a shaft driven by the flow of gas; a member reciprocated by said shaft; a pressure responsive element; a cam, means for positioning said cam by said pressure responsive element; a pivoted oscillatory arm; a one-way clutch mechanism connecting said arm and said index; said oscillatory arm being oscillated in one direction by said member, biasing means for biasing said arm in the opposite direction; said cam being positioned in the path of said arm to limit its movement in accordance with the pressure of the gas; and means comprising a link and a plurality of arms of variable effective length, whereby said cam may be adjusted toward and from the pivot of said oscillatory arm to thereby adjust the operative throw of said arm.

10. In a volumetric gas meter, a corrected index; and means for variably driving said index in accordance with the volume flow and static pressure of the gas comprising a shaft and means for driving said shaft in accordance with the flow of gas through said meter; a crank and means whereby said crank may be rotated by said shaft; a pivoted segment connected to said crank and oscillated thereby; an index operating arm in the path of and oscillated by said segment, a one-way clutch mechanism connecting said index operating arm and said index; a cam member positioned to engage said arm and stop movement thereof; means to bias said arm toward said cam member; and a pressure responsive element for variably positioning said cam in accordance with the static pressure of the gas whereby the operative throw of said arm and corresponding movement of said index is limited in accordance with the pressure.

ALLEN D. MacLEAN.
FRITZ NIESEMANN.